No. 840,412. PATENTED JAN. 1, 1907.
J. H. ACKROYD.
BURNER.
APPLICATION FILED DEC. 23, 1904.
2 SHEETS—SHEET 1.
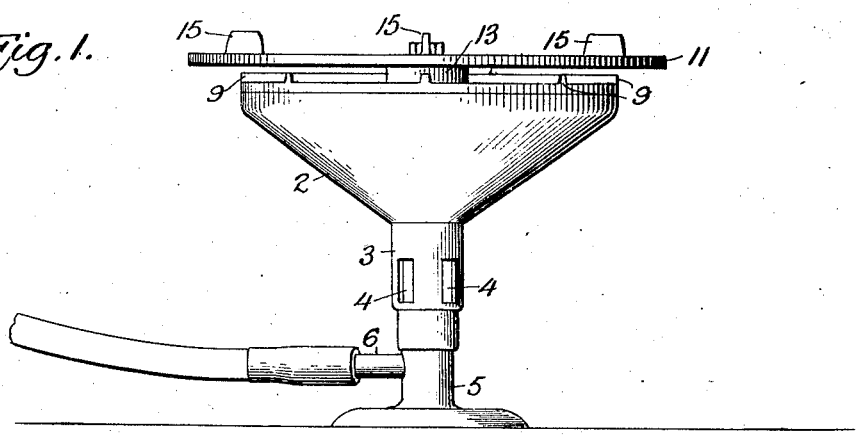
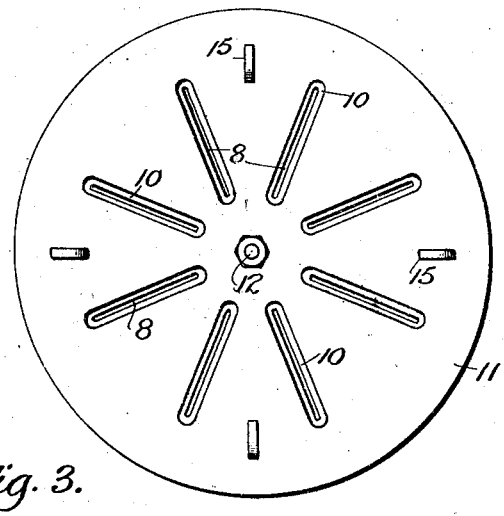
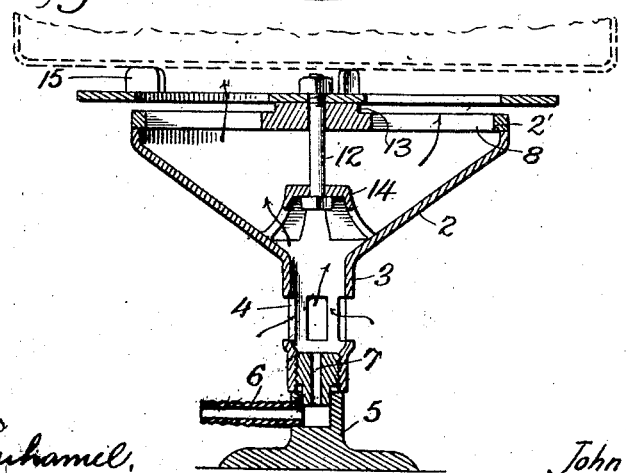
Witnesses
James F. Duhamel,
Fred W. S_____
Inventor,
John H. Ackroyd,
By his Attorneys, Davids & Wells.

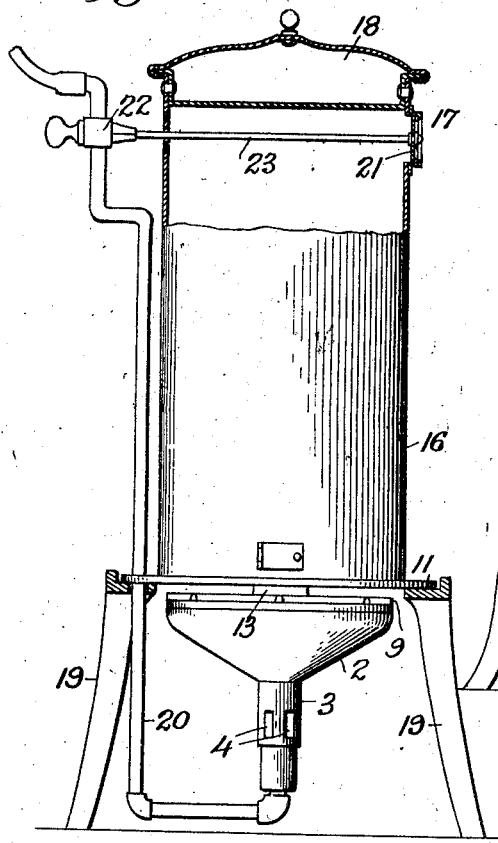
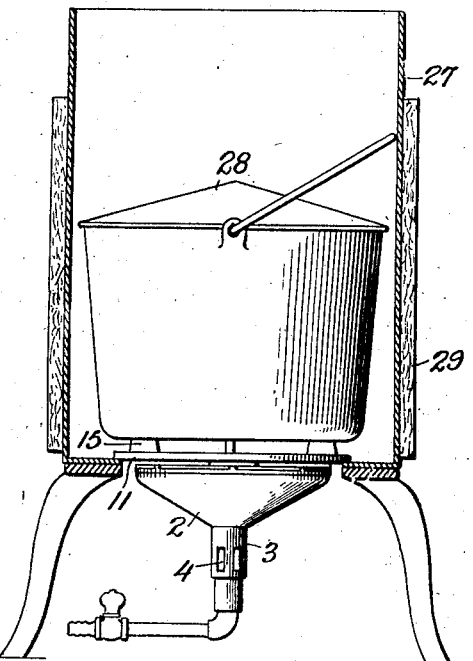
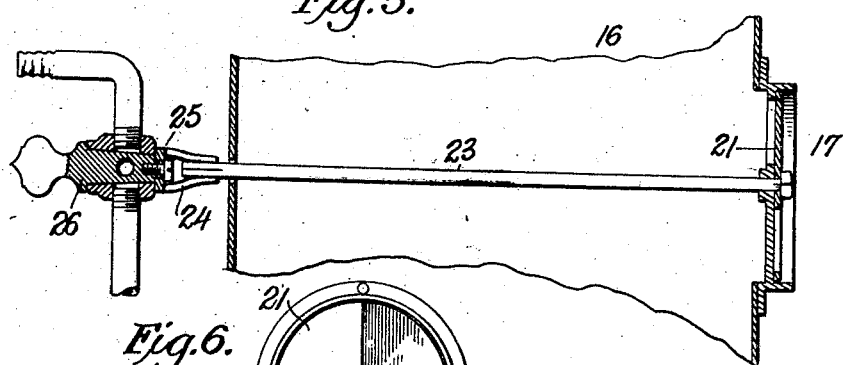

UNITED STATES PATENT OFFICE.

JOHN H. ACKROYD, OF NEW YORK, N. Y.

BURNER.

No. 840,412.  Specification of Letters Patent.  Patented Jan. 1, 1907.

Application filed December 23, 1904. Serial No. 238,056.

*To all whom it may concern:*

Be it known that I, JOHN H. ACKROYD, a citizen of the United States, residing in the borough of Manhattan, in the county of New York and State of New York, have invented a new and useful Improvement in Burners, of which the following is a specification.

The present improvements are applicable to various purposes in the arts—such, for instance, as heaters for atmospheric warming, ovens, furnaces, stoves for cooking, and other purposes, &c.—and are peculiarly adapted for uses in which a high flame temperature in concentrated form is necessary or desirable.

The object of my invention is to provide means in a gas-burner for producing complete combustion of the gas and means for effecting direct transmission of the heat to a body to be heated.

The main features of this invention lie, therefore, in the particular means which are employed to supply that quantity of atmospheric air and that quantity only which is required to furnish the proper amount of oxygen for complete combustion of the gas and at the same time to collect the hot products of combustion free from an excess of atmospheric air and deliver the same directly in contact with a body to be heated.

The question of direct transmission of the heat is of no less importance than that of complete combustion of the gas, and any excess of atmospheric air which is allowed to become mixed with the hot products of combustion means indirect transmission or so much loss in that such air rapidly absorbs the heat and begins to expand, carrying away heat which would otherwise be transmitted directly to the body to be heated. Such results I accomplish by providing means whereby the inductive force of the gas may be utilized to oxygenate the gas before the latter reaches the orifices at which it is burned, according to the well-known Bunsen principle, and means whereby the inductive force of a number of separate flames fed by such oxygenated gas may be utilized to induce a supply of air to flow in contact with all surfaces of each separate flame. The second induction or that resulting in the impingement of air against the burning jets results from the passage of the flames through restricted openings in a plate located above the burner-orifices.

By supplying the air to the apparatus in the manner stated—*i. e.*, by two separate inductions—conditions are present for supplying that quantity of air and that quantity only necessary to effect complete combustion of the gas and for excluding all extraneous atmospheric air from combination and association with the hot products of combustion while the latter are in contact with a body being heated, thereby effecting direct transmission of the heat.

These features, together with others constituting the present invention, are set forn in the drawings, in which—

Figure 1 is an elevation of a multiple outlet-burner embodying the present improvements. Fig. 2 is a plan view thereof. Fig. 3 is a longitudinal section, the plane of the section being defined by the axis of the burner-body and the longitudinal axis of one of the elongated orifices. Fig. 4 is a front elevation, part being broken away, of that form of the invention in which the latter is adapted to the purpose of an atmospheric heater, the valve controlling the outlet from the expansion-chamber of this heater being coupled to the gas-supply valve. Fig. 5 is a detailed section, on a somewhat larger scale, taken through the gas-valve and the valve-controlled outlet of the expansion-chamber. Fig. 6 is an elevation of the valve-controlled outlet of the expansion-chamber. Fig. 7 is partly an elevational view showing a construction in which the burner of Figs. 1, 2, and 3 is applied to a stove having an inclosed casing designed to prevent atmospheric air from becoming mixed with the hot products of combustion while the latter are in contact with the body being heated.

Similar characters of reference designate corresponding parts in all figures.

The burner-body 2 chosen for illustration in Figs. 1, 2, 3, 4, and 7 is conical in form, having a top cover-plate 2' and provided with a tubular extension 3. Openings 4 permit the inflow of air. Gas is fed through an inlet 6, (for the attachment of a flexible gas connection, if desired,) extending from a support, such as 5 in Figs. 1 and 3. From port 7 the gas is delivered to the tubular extension 3 and passing upward therethrough induces an inflow of air in the well-known manner, the mixture passing to the mixing-chamber and issuing through a plurality of burner-orifices 8. There are a suitable number of these orifices, which may be made of any shape, but are preferably made in the form of long narrow slits. Although not essential, these orifices open outward through raised portions 9 on the upper surface of the top cover-plate 2'. Immediately above each burner-orifice is a restricted opening 10 for the passage of the flame or jet. Each such opening is somewhat wider and longer than the corresponding dimension of each burner-orifice and registers therewith, being therefore of the same configuration as, but somewhat larger in area, than the corresponding burner-orifice. These openings are formed by elongated apertures in a plate 11. The passage thus provided between all surfaces of each flame and the edges of each opening 10 for the upward movement of air is of uniform width, containing the additional oxygen necessary for combustion. The plate 11 is spaced somewhat above the top cover-plate 2' by a central boss 13, attached to the top plate 2', but preferably at a point such that the upper plane of the burner-orifice is below the lower plane of the plate 11. A space is thus left open for the inflow of atmospheric air between the lower surface of the plate 11 and the upper surface of the top cover-plate 2', and this inflow results from the inductive action of the burning jet or jets in passing through the openings 10, causing a sheet of air to impinge against the opposite faces of each jet. This space constitutes a preheating-chamber for the inflowing air, being located as it is between the plate 11 and the top cover-plate 2', both of which become highly heated.

In Figs. 1, 2, 3, 4, and 7 plate 11 and the top cover-plate 2' are secured to the burner-body by a bolt 12, which passes centrally through the plate 11 and the top cover-plate 2' and through a cross-piece or spider 14 within the burner-body. Mounted in this manner—that is, the point of attachment of the plate 11 being at the central portion thereof—leaves the outer portions of the plate free to expand and contract with changes of temperature. The induction of air through the restricted openings 10 in the plate 11 may be increased by providing an expansion-chamber 16, Fig. 4, above the plate, having inlet communication at its lower end with the flame-openings 10 and having an outlet 17 at its upper end. The flames passing through the openings 10 and into chamber 16 operate to rapidly heat and displace the air contained in the chamber, and all the air thus displaced from the chamber is replaced by the products of combustion. The rapid expansion and consequent displacement of the products of combustion from the chamber 16 causes a draft of outside air to rush through the openings 10 between the walls of the openings and the side surfaces of the flames, and the velocity of flow of this air through the openings 10 is governed by the size of the chamber 16 and the size of the outlet 17. This air, however, is not permitted to reach the chamber 16 and become mixed with the hot products of combustion without giving up its oxygen to the flame, so that the chamber 16 contains only the hot products of combustion free from atmospheric air. Such a construction—that is, one with a chamber, as described—may be used advantageously as an atmospheric heater, water-heater, oven, furnace, &c., as by this means a very high temperature may be produced in the chamber, or about five times as great a temperature as is produced in the chamber of an ordinary gas heater or oven, &c., burning the same amount of gas. By this means, therefore, direct transmission of the heat to a body to be heated may be effected whether the body to be heated be located outside or inside the chamber.

In Fig. 4 the upper end of the expansion-chamber is closed by a cap or head 18, constituting an insulating air-space, in order to prevent the heat from passing directly upward. In this figure also the support for the burner and the expansion-chamber is formed of legs 19, on which the laterally-extending portion of the plate 11 rests, gas being conducted to the mixing-chamber through an inlet-pipe 20. The wider open the valve 21 controlling the discharge-opening through the outlet 17 the greater should be the flow of gas to the burner. Proper manipulation requires that as this valve is turned to close the opening the gas should be also gradually shut off. The movement in unison is effected in this instance by connecting the operating-stem 23 of the valve 21 with the gas-supply valve 22, the said stem being squared and engaging with the fingers 24, projecting from washer 25, secured to the perforated plug 26 of the valve.

Figs. 1, 2, 3, and 7 represent the application of the invention to a cooking-stove, &c., the plate 11 being provided with pot-supporting lugs 15. In Fig. 7 for the expansion-chamber of Fig. 4 there is substituted the casing 27 of sufficient diameter to enable the cooking vessel 28 to be placed therein upon the lugs 15 of the plate 11. If desired, the casing may be surrounded with insulating material, such as 29. In Fig. 3 the space between the upper portion of the plate 11 and the lower surface of the vessel being heated constitutes an expansion-chamber (analogous to the expansion-chamber already described) from which the products of combustion escape laterally outward, and the two may be caused to approach without in any way affecting the efficiency of the burner in close relationship, provided space enough is left for the escape of the products of combustion.

In the operation of the burner gas and air are caused to flow through the inlet-ports into the burner-body, forming an initial mixture. This initial mixture passes out of the burner-orifices and is lighted, the flames passing through the openings 10 in the plate 11, inducing in their passage through the openings 10 an additional supply of air in the form of a comparatively thin sheet, and this thin sheet of air is held in contact with all surfaces of each flame by the walls of the opening 10 and furnishes the necessary additional oxygen to complete combustion. Such an arrangement, besides producing complete combustion of the gas, insures against the passage of an excess of air over and above that required for combustion through the openings 10 and into the region above the plate 11, occupied by the hot products of combustion. Any excess of air which is allowed to enter this region and become mixed with the hot products of combustion while the same are in contact with the body being heated results in loss, in that such air absorbs and carries away heat which would otherwise be transmitted directly to the body being heated.

Having described my invention, I claim—

1. A burner comprising in combination, a burner-body provided with a burner-outlet orifice and having a gas-inlet and an inlet through which an inflow of air is induced by the gas-flow, and a plate located above and spaced apart from the burner-body having an opening registering with the burner-orifice, whereby the space within said opening between the walls thereof is traversed by the flame, and a flow of air is induced upward from below the plate between the walls of the opening and the side surfaces of the flame.

2. A two-step oxidation burner comprising in combination, a burner-body provided with outlet-orifices and having air and gas inlets whereby an initial mixture in the burner-body is effected, and a plate above the burner-body provided with openings each in register with an outlet-orifice, each of said openings being of substantially the same configuration as but of larger area than each corresponding outlet-orifice, whereby a thin sheet of air of equal thickness may flow upward through each opening between the walls of the opening and the sides of the partially-oxidized and burning mixture.

3. In a gas-burner, the combination, of a burner-body provided with a top-cover portion having a surface area substantially equal to the horizontal cross-sectional area of the burner-body, forming a mixing-chamber having inlet-ports for gas and air, and a plurality of burner-orifices in said top-cover portion, and a plate located above said top-cover portion having a plurality of openings each in register with a burner-orifice, forming an air space or passage between the opposing surfaces of said top-cover portion and said plate, and pot-supporting lugs on said plate.

4. A two-step oxidation burner comprising in combination, a burner-body provided with a plurality of elongated outlet-orifices and having air and gas inlets whereby an initial mixture in the burner-body is effected, and a plate located above and spaced apart from the burner-body provided with a plurality of elongated openings each in register with an elongated outlet-orifice.

5. In an apparatus for burning gas, means for producing complete combustion of the gas and for effecting direct transmission of the heat to a body to be heated, comprising, the combination of a chamber having an outlet at its upper end and having a bottom portion or plate provided with a plurality of inlet-openings, and a burner of the Bunsen type located below and spaced apart from the bottom plate provided with a plurality of burner-outlet orifices each of substantially the same configuration as but of smaller area than each inlet-opening of the bottom plate, and each in register with a corresponding inlet-opening of said bottom plate, substantially as shown and described.

In testimony whereof I have signed my name to this specification in the presence of two subscribing witnesses

JOHN H. ACKROYD.

Witnesses:
PIERSON L. WELLS,
CHAS. H. DAVIDS.